United States Patent

Sugita et al.

[11] Patent Number: 6,070,613
[45] Date of Patent: Jun. 6, 2000

[54] ROTARY FLOW-PATH EXCHANGING VALVE

[75] Inventors: Mitsuo Sugita; Akira Kasai; Noboru Nakagawa; Kazunori Aihara; Kazushige Suzuki; Kazuo Hirata; Toshihiro Teranishi; Mitsuaki Noda; Michiaki Ohno; Fumio Kanasaki, all of Saitama, Japan

[73] Assignee: Kabushiki Kaisha Saginomiya Seisakusho, Tokyo, Japan

[21] Appl. No.: 09/382,574

[22] Filed: Aug. 25, 1999

Related U.S. Application Data

[62] Division of application No. 09/104,176, Jun. 25, 1998, Pat. No. 5,992,459.

[30] Foreign Application Priority Data

| Jun. 25, 1997 | [JP] | Japan | 9-168908 |
| Jun. 25, 1997 | [JP] | Japan | 9-168910 |
| Jul. 28, 1997 | [JP] | Japan | 9-201608 |
| Nov. 5, 1997 | [JP] | Japan | 9-302932 |

[51] Int. Cl.⁷ ................ F16K 31/04
[52] U.S. Cl. ............ 137/625.43; 251/129.11
[58] Field of Search ......... 137/625.43, 625.46; 251/161, 129.11

[56] References Cited

U.S. PATENT DOCUMENTS 2,693,930 11/1954 Carter ............... 137/625.43
5,690,144 11/1997 Takahashi ......... 137/625.43

FOREIGN PATENT DOCUMENTS 7-16084  3/1995  Japan.

*Primary Examiner*—John Fox
*Attorney, Agent, or Firm*—McDermott, Will & Emery

[57] ABSTRACT

In a rotary flow-path exchanging valve, the magnetic force generated in a pair of main magnetic pole pieces (66) by energization of an electromagnetic solenoid is acted on a multi-pole magnet (71) of a main valve element accommodated within a valve housing (1) so that the main valve element (3) is rotated to exchange a flow-path. The multi-pole magnet (71) is made of a plastic magnet of plastic material mixed with magnetic powder. The main valve element (3) and multi-pole magnet (71) are integrally formed by multiple molding. A pair of main magnetic pole pieces (66) magnetically connected to one polarity of the electromagnetic solenoid (11) are arranged. A pair of auxiliary magnetic pole pieces (70) connected to the other polarity of the electromagnetic solenoid (11) are arranged at positions out of phase from the magnetic pole pieces by 90°. The pair of auxiliary magnetic poles (70) are opposed to portions of the multi-pole magnet (71) having a reverse polarity to that of portions of the multi-pole magnet (71) opposite to the main magnetic poles (66).

4 Claims, 8 Drawing Sheets

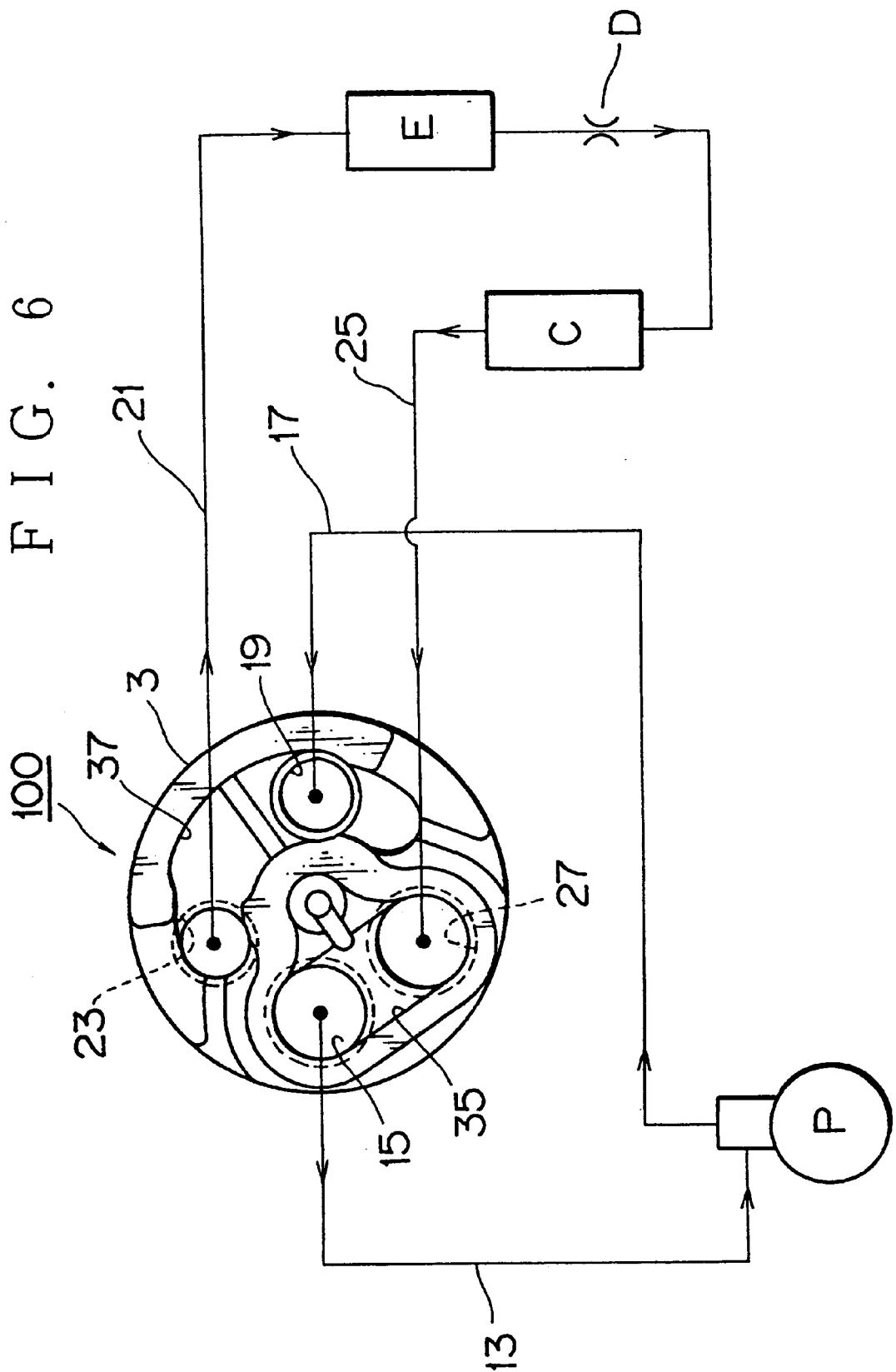

ROTARY FLOW-PATH EXCHANGING VALVE

This application is a divisional of application Ser. No. 09/104,176 filed Jun. 25, 1998 now U.S. Pat. No. 5,992,459.

BACKGROUND OF THE INVENTION

1. Field of the Invention

The present invention relates to a flow path exchanging valve which is a three-way valve or four-way valve and is used to exchange the flow path of refrigerant in a heat pump type air conditioner and more particularly, to a rotary flow-path exchanging valve for exchanging the flow path with the aid of the rotary operation of a valve element.

2. Description of the Prior Art

A previously known typical example of the rotary flow path exchanging valve is a four-way valve disclosed in J-UM-7-16084 (Laid-Open) which comprises a cylindrical valve housing, a valve element rotatably attached to the valve housing, a valve seat plate and an electromagnetic actuator. The valve seat plate includes a low pressure port secured to the valve housing and connected to a low-pressure conduit, a high pressure port secured to a high pressure conduit and at least one exchanging port.

The electromagnetic actuator includes a multi-polar magnet attached to the valve element and having N-poles and S-poles alternately arranged in a rotary direction of the valve element, an electromagnetic solenoid attached to the valve housing and a pair of magnetic poles which are magnetically connected to either one of an N-pole and S-pole generated by energizing the electromagnetic solenoid so that they are magnetized with the same pole as the one magnetic pole, and arranged at their positions out of phase by 180° to oppose to either of the N-pole and S-pole of the multi-pole magnet.

The rotary flow-path exchanging valve is structured such that with the valve element in contact with the vale seat plate at its end surface, the magnetic force, generated in the magnetic pole piece of the valve housing, acts on the multi-pole magnet so that the valve element rotates to connect the exchanging port to either one of the low pressure port and high-pressure port selectively.

In the rotary flow-path exchanging valve, to complete the rotation of the valve element within the valve housing with no trouble is very important to make sure exchange of the flow path.

From this standpoint of view, it is important that the valve element is rotated smoothly when the electromagnetic solenoid is energized. Therefore, the weight of the valve element is very significant.

Meanwhile, the valve element itself, which is generally made of material of synthetic resin with high heat resistance, gives so large an increase in weight due to the material. The multi-pole magnet to be attached to the valve element greatly affects the weight of the entire valve element.

The valve element equipped with a multi-pole magnet in the conventional rotary flow-path exchanging valve is classified into two configurations, one in which the metallic multi-pole magnet formed by sintering is integrally attached by boding agent, ultrasonic fusing or mechanical bonding, and another in which the entire valve is formed of a plastic magnet.

Among them, the metallic multi-pole magnet formed by sintering, which has large weight, is not a preferable material to assure smooth rotation of the valve element. In addition, the metallic multi-pole magnet is not also preferable since it requires a metallic yoke separately to increase the weight of the entire rotary flow-path exchanging valve.

Further, in the configuration in which the metallic multi-pole magnet is integrally attached to the valve element, the end of the multi-pole magnet is apt to break because of its substance. Therefore, such a configuration is problematic in its strength, and is difficult to deal with.

On the other hand, the configuration in which the entire valve is formed of a plastic magnet does not give the problem of using the metallic multi-pole magnet since the former gives a smaller weight than the latter. But, in contrast, this configuration is difficult to give flexibility in hardness, and hence problematic in slidability. Because of this problem, it is uncertain to assure the smooth rotation of the valve element.

The molten resin of the plastic magnet, which is generally poor inflowablity, is poor in moldablity so that it is apt to give poorness such as sink or void. In addition, the configuration, in which the entire valve is formed of the plastic magnet, is difficult to set the plane degree of the sealing plane where the valve element is in slidable contact with the valve seat plate because of poorness of moldablity.

Therefore, in order to realize the light weight of the valve element with no trouble in rotation of the valve element when the multi-pole magnet is formed of the plastic magnet, the problem of slidability must be solved, and actually that of poor moldability and the attendant sealing property must be solved.

Accordingly, in order to realize the small weight of the valve element by using the multi-pole magnet formed of the plastic magnet, the above problems must be first solved. This completes the rotation of the valve element within the valve housing with no problem, thereby realizing sure exchange of the flow path.

In order to complete the rotation of the valve element within the valve housing with no problem in the rotary flow-path exchange valve, not only the above configuration of the multi-pole magnet, but also magnetic force on the multi-pole magnet must be continuously acted until the rotation of the valve element is completed. The magnetic force is generated in the magnetic piece of the valve housing when the electromagnetic solenoid is energized.

In the conventional rotary flow-path exchanging valve, as described above, the pair of magnetic pole pieces are arranged at their positions out of phase by 180° to oppose to either one of the N-pole and S-pole of the multi-pole magnet. The are magnetically connected to one of the N-pole and S-pole generated when the electromagnetic solenoid is energized so that they are magnetized with the same polarity as that of the one magnetic pole. Such a configuration leads to the following problem.

When energization of the electromagnetic solenoid is stopped upon completion of exchange of the flow path, the magnetic force remaining in the pair of magnetic poles is weak. For this reason, if the magnetic force of the multi-pole magnet is strong, the magnetic force remaining in the pair of magnet pieces cannot attract the multi-pole magnet portion opposite to them when the valve element has been rotated.

Thus, the multi-pole magnet portion with an opposite magnetic polarity, adjacent to the multi-pole magnet portion opposite to the pair of magnetic pieces when the valve element has been rotated, approaches to attract each magnetic piece which is only metal with the magnetic polarity lost. Therefore, the valve element slightly rotates toward the opposite side to when the electromagnetic solenoid is energized so that the changing boundary of the magnetic poles in the multi-pole magnet is located at the center of the magnetic piece. Accordingly, the valve element cannot be held at a flow-path exchanging completing position.

However, if the magnetic force is reduced to suppress the reverse rotation of the valve element after the energization of the electromagnetic solenoid has been stopped, now the rotation torque generated in the valve element when the electromagnetic solenoid is energized is decreased. As a result, the valve element becomes apt to suffer from the influence such as friction and hence cannot be rotated surely.

In this way, in order that the magnetic force, generated in the magnetic piece of the valve housing when the electromagnetic solenoid is energized, is continuously acted on the multi-pole magnet until rotation of the valve element is completed, thereby completing the rotation of the valve element, the structure of the magnetic piece of the valve housing must be improved.

A rotary flow-path exchanging valve equipped with a pilot valve is proposed which includes a pressure chamber defined by the other end surface of a valve element within a valve housing and into which pressure at a high pressure port is introduced and the pilot valve for communicating the pressure chamber with a low pressure port. In this rotary flow-path exchanging valve, when an electromagnetic solenoid is energized, the valve element is rotated and the open/close of the pilot valve is also done.

In a stationary state, the rotary flow-path exchanging valve permits air-tightness between a high pressure port and a low pressure port in a stationary state. This is because the valve element is pressed on a valve seat plate owing to introduction of the pressure at the high pressure port into the pressure chamber. At the time of exchange of the flow path, the rotary flow-path exchanging valve opens the pilot valve prior to rotation of the valve element. Then, the high pressure state of the pressure chamber is released through communication of the pressure chamber with the low pressure port. Thus, the valve element floats from the valve seat plate by a difference between the pressure chamber and the valve seat plate, thereby rotating the valve element by low resistance.

In the rotary flow-path exchanging valve equipped with the pilot valve described above, the valve element is provided with a valve port which is opened/closed by the pilot valve to make connection/disconnection between the pressure chamber and the low pressure port. The pilot valve fits, movably in an axial direction, into a pilot guide formed in the valve housing and into a valve holding hole formed in the valve element. The pilot valve is individually supported by both valve housing having an electromagnetic solenoid and the valve element having the valve port.

Further, the high pressure port and low pressure port are arranged at a position displaced in a radial direction from the rotation center of the valve element on the valve seat. For this reason, when the valve element floats so as to be apart from the valve seat plate, the valve element tilts owing to the pressure of fluid flowing in between the valve element and valve seat plate from the high pressure port. As a result, rubbing occurs between the valve housing and pilot valve and between the valve element and pilot valve.

Thus, the movement of the valve element in a rotary axial direction and open/close operation of the pilot valve become unstable. This impairs smooth rotation of the valve element and simplicity of the operation of exchanging the flow path based on the rotation of the valve element. In addition, the main valve element and pilot valve suffer from abnormal aberration so that endurance thereof is impaired.

SUMMARY OF THE INVENTION

The present invention has been accomplished in order to attain an object of completing the rotating operation of a valve element within a valve housing to make sure exchange of a flow path.

A first object of the present invention is to provide an improved rotary flow-path exchanging valve which, when a multi-pole magnet is formed of a plastic magnet to reduce the its weight, is free from the problems in slidability of a valve element, strength of the multi-pole magnet and size stability (plane degree) of resin molding of the valve element.

A second object of the present invention is to provide a rotary flow-path exchanging valve which causes magnetic force to be continuously acted on a multi-pole magnet so that a valve element can be held at a flow-path exchange completion position even if the magnetic force of the multi-pole magnet is strong, thereby providing reliability for the valve operation.

A third object of the present invention is to provide a rotary flow-path exchanging valve which prevents a valve housing, a valve element or pilot valve from suffering from rubbing thereamong to improve the relative size accuracy of each component, can guide the open/close operation of a pilot valve necessary to separate the valve element from a valve seat plate for its rotation and movement of the valve element itself in a rotary axial direction, and prevent the valve element and pilot valve from suffering from abnormal aberration.

In order to attain the first object, there is provided a rotary flow-path exchanging valve comprising: a cylindrical valve housing; a valve element rotatably provided within the cylindrical valve housing; a valve seat plate having a low pressure side port secured to the valve housing and connected with a low pressure side conduit, a high pressure side port connected to a high pressure side conduit and an exchanging port; an electromagnetic actuator including a multi-pole magnet attached to the valve element, an electromagnetic solenoid attached to the valve housing and a magnetic pole member attached to the valve housing and magnetized by the electromagnetic solenoid so that it rotates the valve element by an magnetic interaction between the multi-pole magnet and the magnetic pole member; the valve element being in contact with said valve seat plate in its one end surface so that the exchanging port is selectively communicated with either one of the low pressure side port and the high pressure side port by rotation; the multi-pole magnet being formed of a plastic magnet of a plastic material mixed with magnetic powder; and the valve element and the multi-pole magnet being integrally formed by multiple molding.

In order to attain the second object, in accordance with the present invention, there is provided a rotary flow-path exchanging valve comprising: a cylindrical valve housing; a valve seat plate having a low pressure side port secured to the valve housing and connected to a low pressure side conduit, a high pressure side port connected to a high pressure side conduit and an exchanging port; a valve element rotatably provided within the cylindrical valve housing and brought into contact with the valve seat plate in its one end surface so that the exchanging port is selectively communicated with either one of the low pressure side port and the high pressure side port by rotation; and an actuator including a multi-pole magnet attached to the multi-pole magnet attached to the valve element, an electromagnetic solenoid, a pair of main magnetic pole pieces, and a pair of auxiliary magnetic pole pieces, wherein the multi-pole magnet includes an S-polarity and N-polarity alternately arranged in a rotary direction attached to said valve element, the pair of main magnetic pole pieces are magnetically coupled with one of the N-polarity and said S-polarity generated when said electromagnetic solenoid is energized and magnetized with the one polarity, and is opposed to the one polarity of the N-polarity and S-polarity at rotary positions out of phase by 180° from each other; the pair of auxiliary magnetic pole pieces are magnetically coupled with the other polarity of said N-polarity and said S-polarity generated when the electromagnetic solenoid is energized and magnetized with the other polarity, and is opposed to the other polarity of said N-polarity and S-polarity at rotary positions out of phase by 180° from each other; and the main magnetic pole pieces each has a larger sectional area and is magnetized with stronger magnetic force than said auxiliary magnetic pieces.

In order to attain the third object, in accordance with the present invention, there is provided a rotary flow-path exchanging valve comprising: a cylindrical valve housing; a valve seat plate having a low pressure side port secured to the valve housing and connected to a low pressure side conduit, a high pressure side port connected to a high pressure side conduit and an exchanging port; a valve element rotatably provided within the cylindrical valve housing and movably provided in a rotary axial direction thereof, the valve element being brought into contact with said valve seat plate in its one end surface so that the exchanging port is selectively communicated with either one of said low pressure side port and the high pressure side port by rotation; a pilot valve, defined on the side of the other end surface opposite to the one end surface of the valve element, for selectively communicating a pressure chamber into which pressure at the high pressure side port is introduced and the low pressure side port; an electromagnetic solenoid for rotating said valve element and opening/closing said pilot valve, wherein the valve housing comprises a first guiding cylinder for movably supporting said pilot valve in the rotary axial direction and a second guiding cylinder for supporting the valve element, displaced from the first guiding cylinder in the rotary axial direction; said valve element includes a guiding member protruding, in the rotary axial direction, from the other end surface located on the side of the pilot valve and partially abutting at its side on the inner periphery of the valve guiding cylinder in the peripheral direction, whereby when the valve moves in the rotary axial direction, the guiding member abutting on the inner periphery of the valve element guiding cylinder slides in the rotary axial direction on the inner periphery of the valve element.

The above and other objects and features of the present invention will be more apparent from the following description taken in conjunction with the accompanying drawings.

BRIEF DESCRIPTION OF THE DRAWINGS

FIG. 6 is a view for explaining a refrigerant circuit during heating in a heat pump system in which the rotary flow-path exchanging valve is built;

DESCRIPTION OF THE PREFERRED EMBODIMENTS

Figure 1:
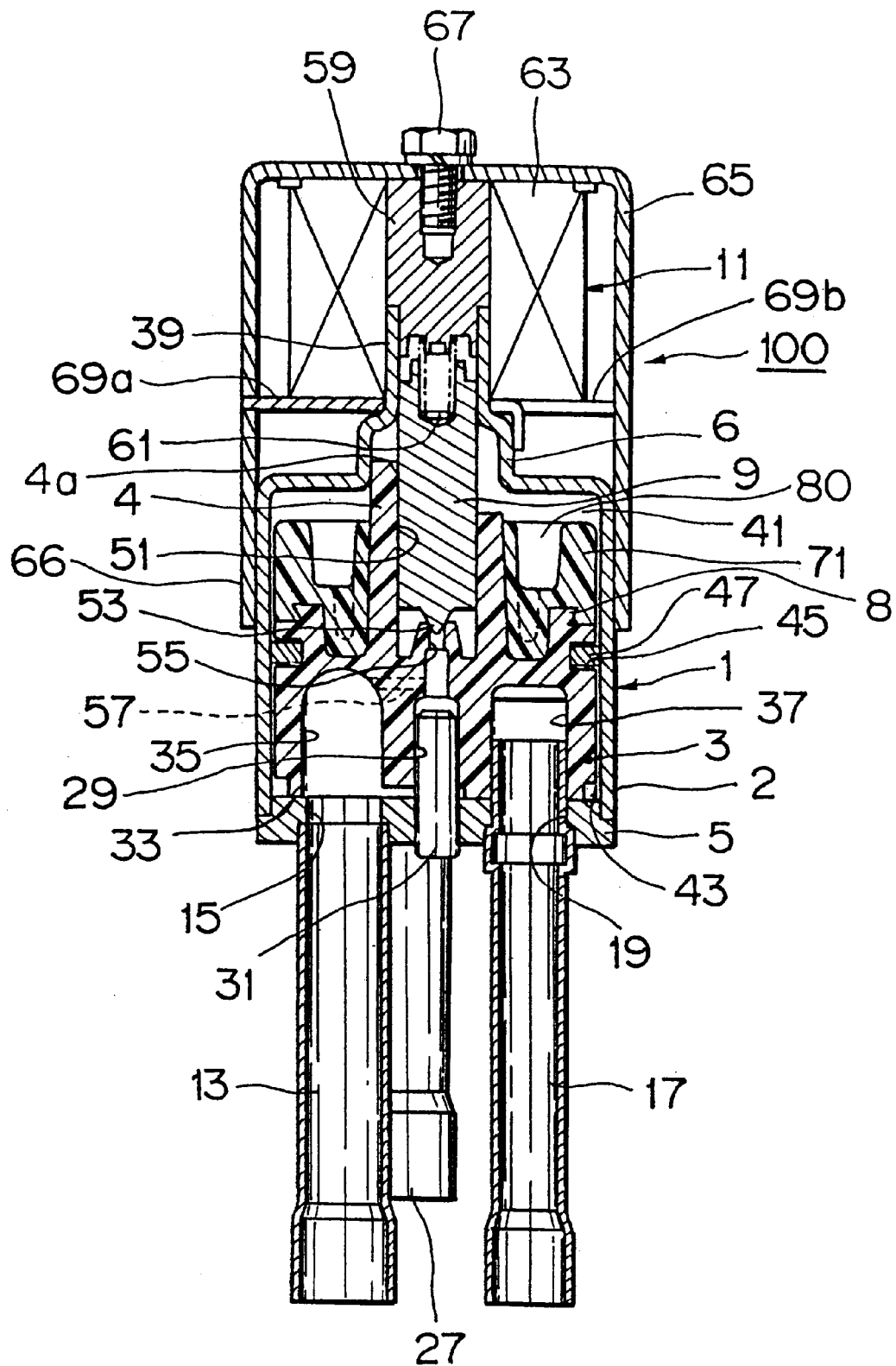
FIG. 1 is a longitudinal sectional view of an embodiment of a rotary flow-path exchanging valve according to the present invention.
Figure 2:
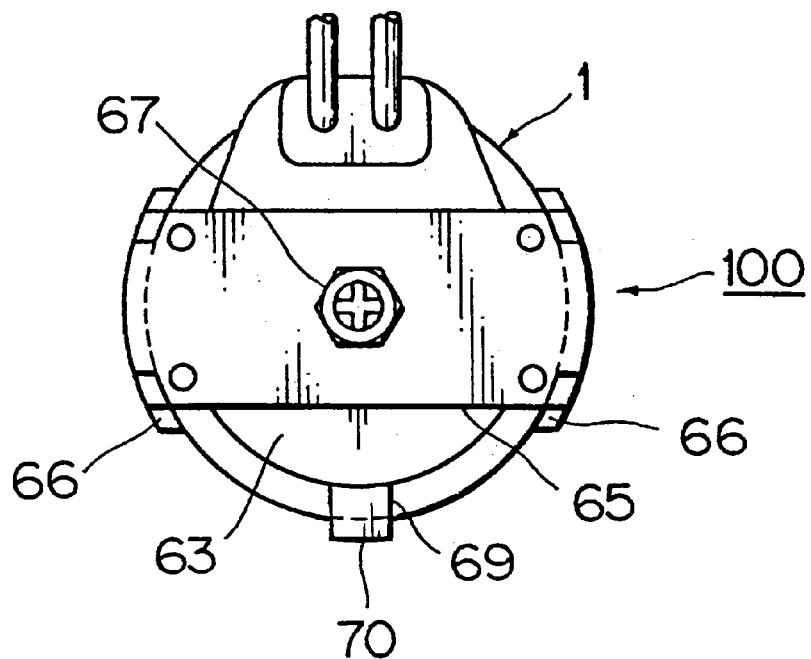
FIG. 2 is a plan view of the rotary flow-path exchanging valve of FIG. 1.
Figure 3:
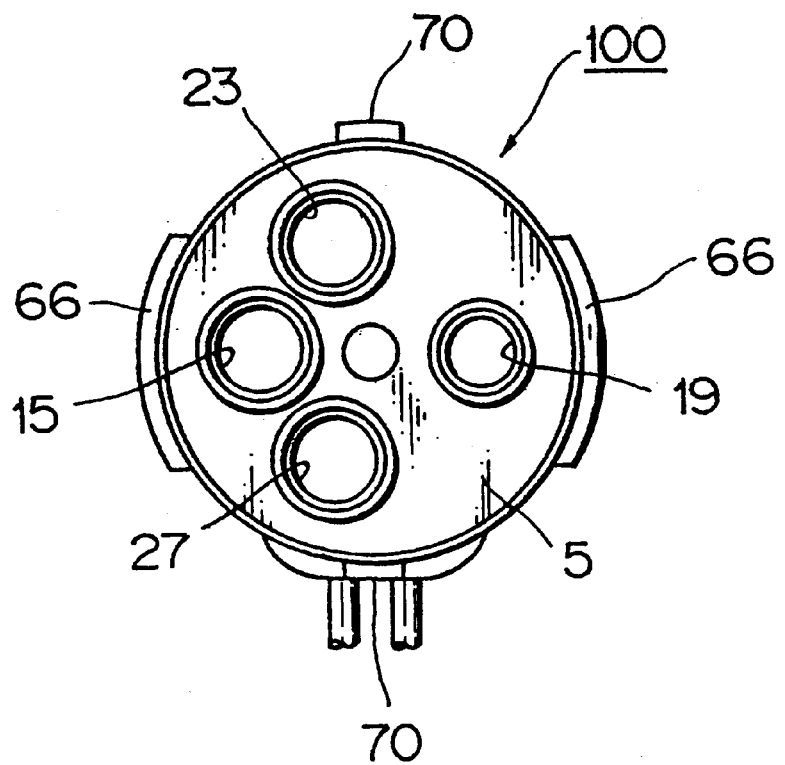
FIG. 3 is a bottom view of the rotary flow-path exchanging valve of FIG. 1.
Figure 4:
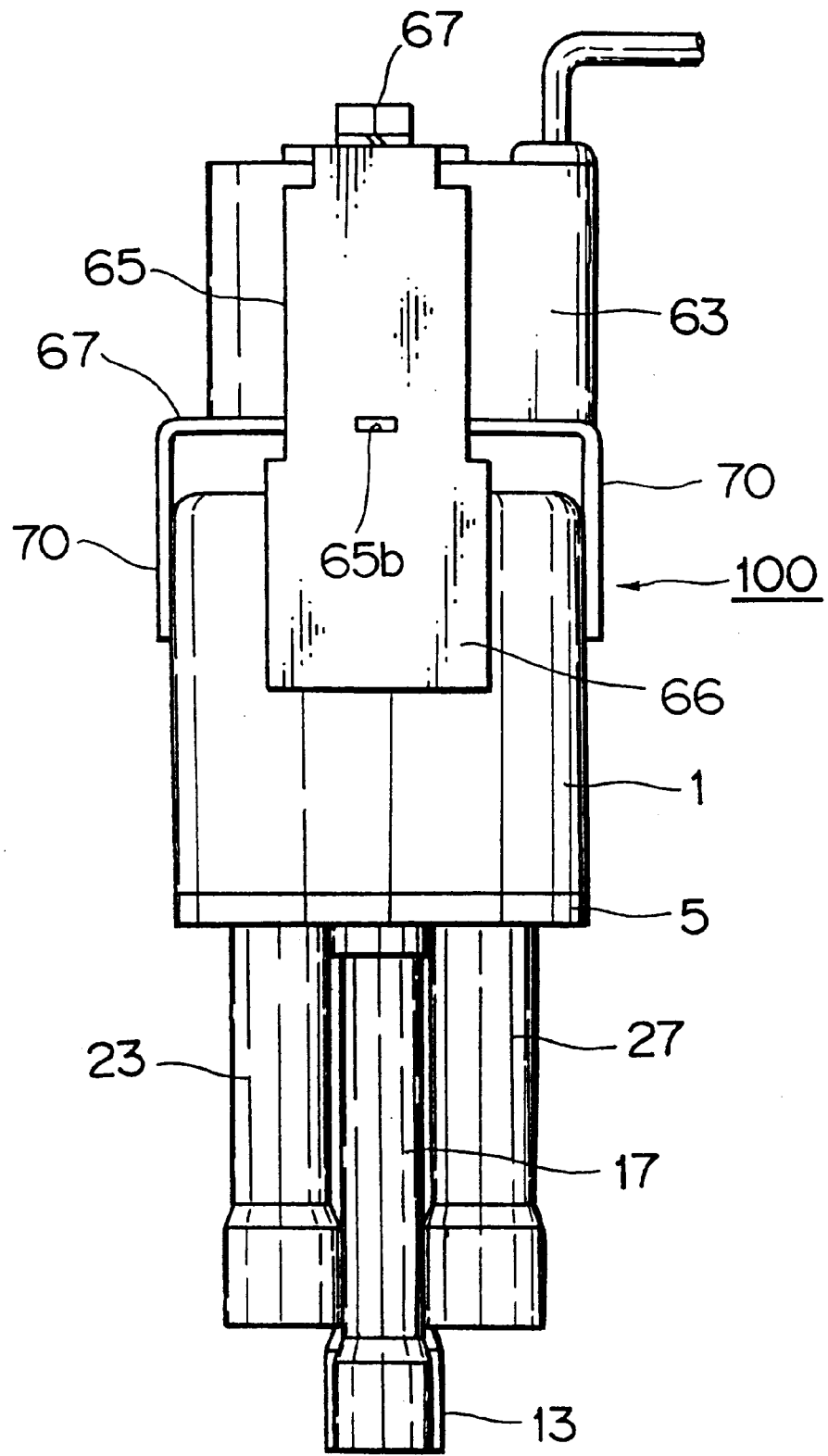
FIG. 4 is a side view of the rotary flow-path exchanging valve of FIG. 1.

Now referring to FIGS. 1–10, an explanation will be given of the configuration of a flow-path exchanging valve according to an embodiment of the present invention.

The rotary flow-path exchanging valve according to this embodiment includes a cylindrical valve housing 1, a main valve element 3 which is provided rotatably and movably in a rotary axial direction, a valve seat plate 5 secured to the bottom of the valve housing 1, a pilot valve 9 and an electromagnetic solenoid 11 attached to the upper portion of the valve housing 1.

Figure 5:
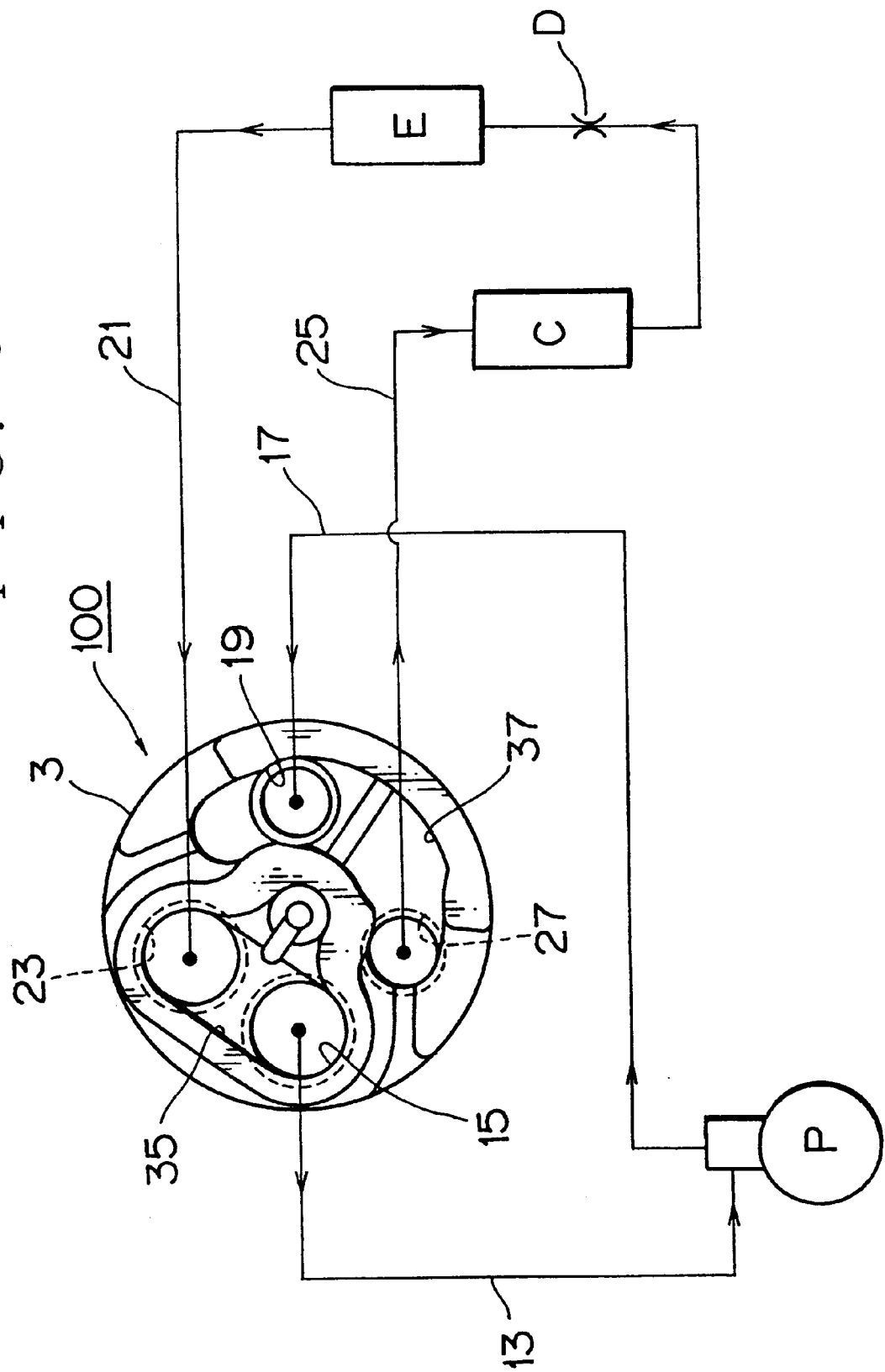
FIG. 5 is a view for explaining a refrigerant circuit during cooling in a heat pump system in which the rotary flow-path exchanging valve is built.

The rotary flow-path exchanging valve, as seen from FIGS. 5 and 6, is structured as a four-way valve 100 used in a heat pump system. At the positions displaced radially from the center thereof, the valve seat plate 5 has a low pressure port 15 with a low pressure conduit 13 connected from a suction side of a compressor P in the heat pump system, a high pressure port 19 with a high pressure side conduit 17 connected from a discharge side of the compressor P, a first exchanging port 23 connected to a conduit 21 of an indoor heat exchanger E and a second exchanging port 27 connected to a conduit 25 of an outdoor heat exchanger C.

As seen from FIG. 1, the main valve element 3 fits over a center pin 31 secured to the valve seat plate 5 by means of a center guide hole 29 provided at the bottom, and fits into a guiding cylinder 6 for the main valve element so that it is movable in the axial direction. In this case, the guiding cylinder 6 is provided coaxially with a large diameter cylinder 2 at the upper part of the valve housing 1 by means of a guiding tongue-shaped member 4 protruded from the upper surface. Because of provision of these guiding members, the main valve element 3 is rotatable between the first rotating position and the second rotating position around its center axis and vertically movable between the ascended position and descended position in the axial direction.

The guiding member 4, which is formed on an opposite side to a high pressure communicating groove 37 described later, suppresses the tilt of the main valve element 3 due to the suction pressure on the high pressure side in its abutting relationship with the guiding cylinder 6.

At the descended position, the main valve element 3 is in contact with the valve seat plate 5 in its bottom (one end surface) 33, and has a low pressure communicating groove 35 and a high pressure communication groove 37 which are independent of each other.

At the first rotating position, as seen from FIG. 5, the main valve element 3 communicates the low pressure port 15 with the first exchanging port 23 by means of the low pressure communicating groove 35 and also communicates the high pressure port 19 with the second exchanging port 27 by means of the high pressure communicating groove 37. On the other hand, at the second rotating position, as seen from FIG. 6, the main valve element 3 communicates the low pressure port 15 with the second pressure exchanging port 27 by means of the low pressure communicating groove 35 and also communicates the high pressure port 15 with the first exchanging port 23 by means of the high pressure communicating groove 37.

Thus, in the exchanging state where the main valve element 3 is at the first rotating position, as seen from FIG. 5, a circulating passage of refrigerant is built which travels in the course of the compressor P→four-way valve 100→outdoor heat exchanger C→diaphragm D→indoor heat exchanger E→four-way valve 100→compressor P. Thus, the heat pump system is placed in a cooling mode.

Thus, in the exchanging state where the main valve element 3 is at the second rotating position, as seen from FIG. 6, a circulating passage of refrigerant is built which travels in the course of the compressor P→four-way valve 100→indoor heat exchanger E→diaphragm D→outdoor heat exchanger C→four-way-valve 100→compressor P. Thus, the heat pump is placed in a heating mode.

Incidentally, the tip of the high pressure side conduit 17 penetrates through the high pressure port 19 and protrudes into the high pressure side communicating groove 37. It abuts on the inner wall of the high pressure communicating groove 37 to serve as a stopper for limiting the rotating range of the main valve element 3 to a reciprocating range between the first rotating position and second rotating position.

On the upper side of the main valve element 3 (other end surface), as shown in FIG. 1, a pressure chamber 41 is defined by the valve housing 1 and pilot valve 9 fitting into the guiding cylinder 39 formed at the upper portion of the valve housing 1. The pressure chamber 41 communicates with a high pressure side communicating groove 37 and high pressure side port 19 through a bypassing gap 43, which is located between the pilot valve 9 and main valve element 3, and a slit 49, which is formed between both ends of a C-shaped piston ring 47 fit into the piston ring groove 45 of the main valve element 3. Thus, the pressure at the high pressure side port is introduced into the pressure chamber 41.

The guiding cylinder 39 is provided concentrically with the large diameter cylinder 2 and the guiding cylinder 6. The plunger 10 of the pilot valve 9 fits movably, in an axial direction, into a valve holding hole 51 having a circular sectional plane formed in the guiding cylinder 39 and at the central portion of the main valve element 3. The plunger 10 opens/closes the valve port 55 formed at the main valve element 3 by means of a needle valve 53 at the tip.

In this configuration, the pilot valve 9 fits, in an axial direction, into the guiding cylinder 39 on the side of the valve housing 1 and the valve holding hole 51 on the side of the main valve element 3, and hence are individually supported by both the valve housing 1 and main valve element 3.

Figure 8A:
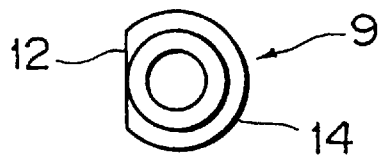
FIGS. 8A to 8D are end views each showing a pilot valve of FIG. 1.
Figure 8B:
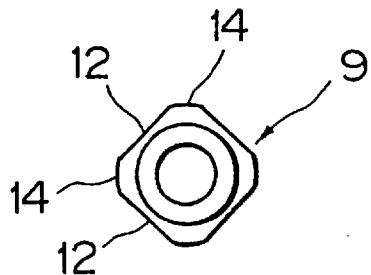
Figure 8C:
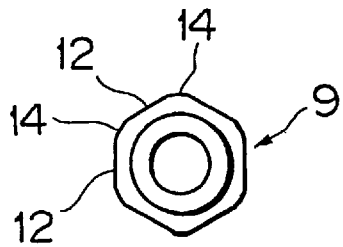

The plunger 10 may have a concrete configuration as shown in FIGS. 8A–8C in which a cut face 12 is made on the outer periphery to form a D-shaped cross section or a polygonal cross section and only the remaining circular face 14 fits into the guiding cylinder 39 and holding hole 51.

In this case, between the cut face 12 of the pilot valve 9 and valve holding hold 51, a passage (not shown) communicates the pressure chamber 41 with the valve port 55.

Figure 8D:
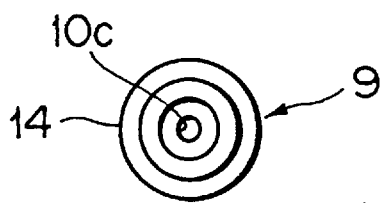

The plunger 10 may have another concrete configuration as shown in FIG. 8D in which an outer face corresponding to the inner face of the guiding cylinder 39 and valve holding hole 51 to form a cylinder shape and the entire circular face fits into the guiding cylinder 39 and valve holding hole 51.

Figure 8E:
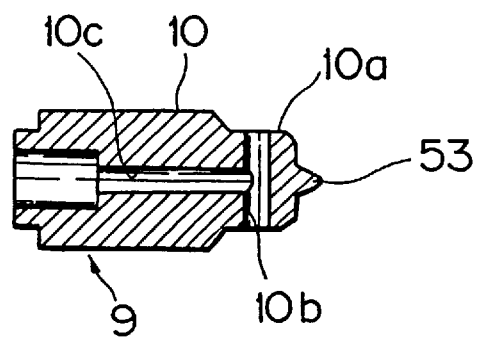
FIG. 8E is a sectional view of the pilot valve of FIG. 8D.

In this case, as shown in FIG. 8E, a small diameter portion 10a is formed at a tip near to the needle valve 53 of the plunger 10. At the small diameter portion 10a, a through-passage 10b passing the center of the plunger 10 is passed through in a radial direction of the plunger 10. A communicating passage 10c is formed which extends from an end surface located on the guiding cylinder 39 to the center of the passage 10b. Thus, the through-passage 10b, communicating passage 10c and the space between the small diameter portion 10a and valve holding hole 51 form a passage communicating the pressure chamber 41 and valve port 55.

The valve port 55, located at the center of the valve holding hole 51, on one hand, communicates with the pressure chamber 41 through the bypassing gap 43, and on the other hand, also with the low pressure side communicating groove 35 through the communicating hole 57.

The valve housing 1 is integrally formed by processing of deep drawing so that the large diameter cylinder 2 to receive the main valve element, is concentric with the guiding cylinder 6 and the guiding cylinder 39.

The pilot valve 9 is urged in a valve-closing direction by a spring 61 formed between the electromagnetic solenoid 11 and fixed absorber 59. When the electromagnetic coil 63 is energized, the pilot valve 9 is adsorbed on the fixed absorber 59 against the spring force so that the valve port 55 is opened.

In this embodiment, the amount of the refrigerant flowing from the high pressure side port 19 into the pressure chamber 41 via the communicating groove 37, bypassing gap 43 and slit 49 is less than that of refrigerant flowing from the pressure chamber 41 to the valve port 55 through the passage between the cut face 12 of the pilot valve 9 and the valve holding hole 51 and passage within the plunger 10 of the pilot valve 9 and flowing into the low pressure side communicating groove 35 through the communicating hole 57.

The multi-pole magnet 71 is integrally formed on the main valve element 3. The multi-pole magnet 71, as shown in FIG. 7, is ring-shaped concentrically with the main valve element 3, and has two N-poles and two S-poles magnetized alternately in a rotary direction of the magnetic valve element 3.

The multi-pole magnet 71 is formed of a plastic magnet which is made by mixing plastic material such as polyamide resin (PA) or polypropylene resin (PP) with magnetic powder such as magnetic ferrite powder.

The main valve element 3 is made of resin material with high moldability, slidability and fluidity resistance which has, as a basic material, engineering plastic such as polyamide, polypropylene, polyimide, etc. The melting points of the multi-pole magnet 71 and main valve element 3 give no problem in fabrication whether or not they are equal or different. The main valve element 3 and multi-pole magnet 71 are integrally molded by "multiple molding". Incidentally, at the coupling portion between the main valve element 3 and the multi-pole magnet 71, an inverse-tiled stopping portion 8 is formed.

The multi-pole magnet 71 made of the plastic magnet is provided with a hollow portion 72 for reducing the material and weight in its outer peripheral face opposite to the main magnetic pole member 65 described below.

A staple-shaped main magnetic pole member 65, magnetically coupled with the upper one magnetic pole of the electromagnetic pole 63, is secured to the electromagnetic solenoid 11 by a bolt 67. A staple-shaped auxiliary magnetic member 69, magnetically coupled with the lower other magnetic pole of the magnetic pole 63, is secured thereto at the position out of phase by 90° from the main magnetic member 65 with respect to the center line of the valve housing 1.

The main magnetic pole member 65 includes a pair of magnetic pole pieces 66 formed of a pair of leg pieces, opposite to the one magnetic pole of the multi-pole magnet 71 at the positions out of phase by 180° from each other.

The auxiliary magnetic pole member 69 includes a pair of auxiliary magnetic pole pieces 70 formed of a pair of leg pieces, opposite to the other magnetic pole of the multi-pole magnet 71 at the positions out of phase by 90° from the main magnetic pole pieces and by 180° from each other.

Figure 9:
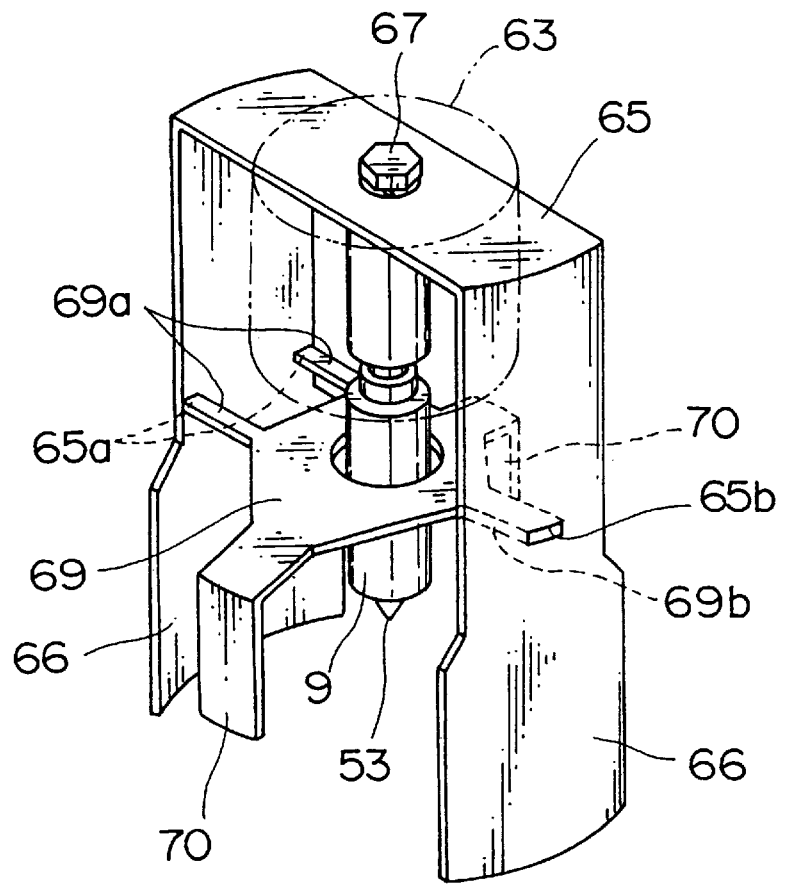
FIG. 9 is a perspective view showing the assembling relationship between a main magnetic pole member and an auxiliary magnetic pole member in the rotary flow-path exchanging valve shown in FIG. 1.
Figure 10:
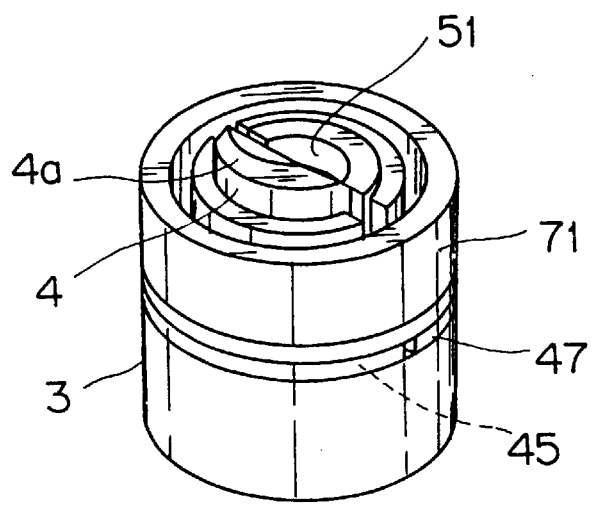
FIG. 10 is a perspective view of a main valve element shown in FIG. 1.

As shown in FIG. 9, the auxiliary magnetic pole member 69 also includes connection bridging pieces 69a, 69b extending in a direction out of phase by 90° from the auxiliary magnetic pole pieces 70. The connection bridging pieces 69a, 69b are engaged, at their tips, with small openings 65a, 65b formed in the main magnetic pole member 65, and positioned for the main magnetic pole member 65 through such a spot-like engagement. Thus, the relative position relationship between the main magnetic pole pieces 66 and the auxiliary magnetic pole pieces 70 are uniquely defined and unchanged. The main magnetic pole member 65 and the auxiliary magnetic pole member 69, which are engaged with each other in a spot fashion, give less loss in magnetic force when the electromagnetic solenoid 11 (electromagnetic coil 63) is excited.

In the electromagnetic actuator structure composed of the electromagnetic solenoid 11 and multi-pole magnet 71 thus configured, in accordance with the direction of a current flowing through the electromagnetic solenoid 11, the main magnetic pole member 65 is magnetized with an N-pole while the auxiliary magnetic pole member 69 is magnetized with an S-pole, and vice versa. Their magnetic operation with the multi-pole magnetic 71 rotates the main valve element 3 from the first rotary position to the second rotary position and vice versa.

In the four-way valve 100 thus structured, when the electromagnetic coil 63 is energized in a state as shown in FIG. 1, the fixed absorber 59 is excited so that the pilot valve 9 ascends against the spring force of the spring 61 and is adsorbed to the fixed adsorber 59. Thus, the valve port 55 is opened.

Then, the pressure chamber 41 communicates with the low pressure side communicating groove 35 and low pressure side port 15 so that owing to the absorption pressure of the compressor P, the internal pressure of the pressure chamber 41 lowers from the same high pressure as that at the high pressure side port 19 to the same low pressure as that at the low pressure side port 15. Thus, the pressure on the upper side of the main valve element 3 becomes lower than that on the lower side thereof. Because of a resultant pressure difference, the main valve element 3 ascends to leave from the valve seat plate 5. Accordingly, the side of the guiding portion 4, abutting the guiding cylinder 6 of the valve housing 1, slides upwards.

When the valve port 55 abuts the needle valve portion 53 to close it, the ascent of the main valve element 3 is limited. In this case, the pressures on the upper and lower sides of the main valve element 3 are balanced so that the main valve element is placed in a state where it is rotatable with low resistance.

When the pilot valve 9 is opened, the inner pressure of the pressure chamber 41 is lowered for the reason described above why the amount of the refrigerant flowing from the high pressure side port 19 into the pressure chamber 41 via the high pressure side communicating groove 37, bypassing gap 43 and slit 49 of the piston ring 47 is less than that of refrigerant flowing from the pressure chamber 41 to the valve port 55 through the passage between the cut face 12 of the pilot valve 9 and the valve holding hole 51 and passage within the plunger 10 of the pilot valve 9 and flowing into the low pressure side communicating groove 35 through the communicating hole 57.

Figure 7A:
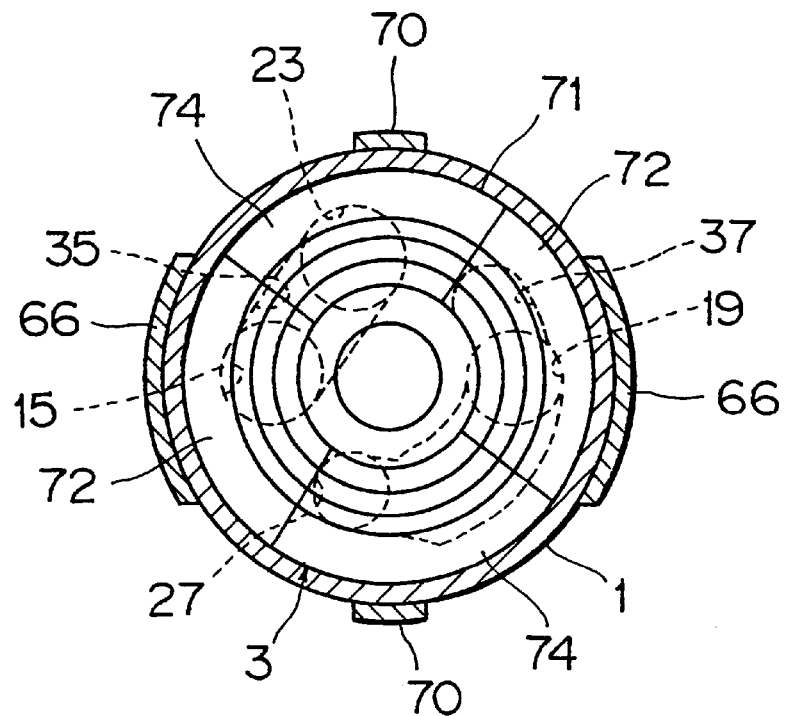
FIGS. 7A and 7B are sectional views each showing an electromagnetic actuator of a rotary flow-path exchanging valve according to the present invention.
Figure 7B:
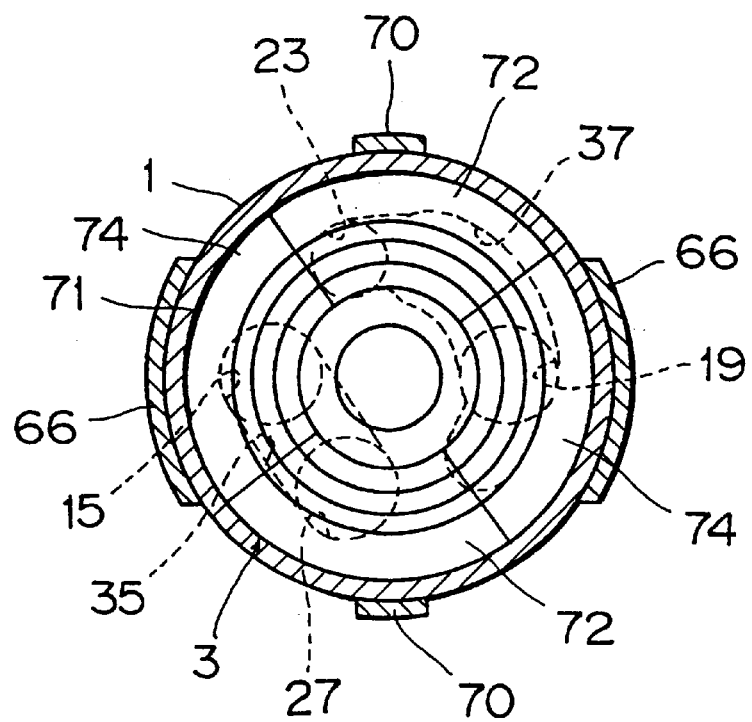

In this state, magnetic repulsion becomes active between the main magnetic piece 66 magnetized with the N-polarity and the opposite N-polarity portion 72 of the multi-pole magnet 71, and between the auxiliary magnetic piece 70 of the auxiliary magnetic pole member 69 magnetized with the S-polarity and the opposite S-polarity portion 74. As a result, the main valve element 3 rotates counter-clockwise in FIGS. 5 and 6 so that it rotates from the first rotary position (FIG. 5 and FIG. 7A) to the second rotary position (FIG. 6 and FIG. 7B).

Thus, the S-polarity portion 74 of the multi-pole magnet 71 is adsorbed oppositely to the main magnetic pole piece 66 magnetized with the N-polarity while the N-polarity portion 72 is adsorbed oppositely to the auxiliary magnetic pole piece 70 magnetized with the S-polarity. The main valve element 3 is held at the second rotary position and hence the heat pump cycle is exchanged from the cooling mode into the heating mode.

Thereafter, when energization of the electromagnetic coil 63 is stopped, because of small residual magnetic force of the pair of magnetic pole pieces 66, their N-polarity cannot adsorb the opposite S-polarity portion 74. Thus, the N-polarity portion 72 adjacent to the S-polarity portion 74, which has been opposite to the main magnetic pole piece 66 when the main magnetic polarity piece 66 has been located at the first rotary position before energization of the electromagnetic coil 63, is apt to be adsorbed on the main magnetic polarity piece 66 which has lost the magnetic polarity and is only a metal. As a result, force for urging the main valve element 3 to return from the second rotary position to the first rotary position is generated.

However, at the second rotary position of the main valve element 3, owing to the force generated when the S-polarity portion 74 opposite to the auxiliary magnetic pole piece 70 is apt to be adsorbed on the auxiliary magnetic pole piece 70 which has lost the magnetic polarity and is only a metal, the rotating force of the main valve element 3 in a direction of returning from the second rotary position to the first rotary position is suppressed.

When energization of the electromagnetic coil 63 is stopped, the pilot valve 9 descends by the spring force of the spring 61 to close so that communication between the pressure chamber 41 and low pressure side communicating groove 35 is interrupted. Thus, the pressure at the high pressure side communicating groove 37 and high pressure side port 19 is introduced into the pressure chamber 41 through the bypassing gap 43 and the communicating gap of the piston ring 47. Accordingly, since the pressure chamber 41 gives pressure equal to that at the lower portion of the main valve element 3, the main valve element 3 returns to the original descended position owing to the spring force of the spring 61 and its own weight. The main valve element 3 is brought into intimate contact with the valve seat plate 5 so that it is stably held at the second rotary position (flow path exchange completion position). This enhances reliability of the operation.

When the heat pump cycle is to be exchanged from the heating mode into the cooling mode, the electromagnetic coil 63 is energized in a direction reverse to the case where the heat pump cycle is exchanged from the cooling mode to the heating mode. The pilot valve 9 is opened to ascend the main valve element 3. In addition, the main magnetic pole piece 66 is magnetized with the S-polarity while the auxiliary magnetic pole piece 70 is magnetized with the N-polarity.

Then, magnetic repulsion becomes active between the main magnetic piece 66 magnetized with the S-polarity by energization of the electromagnetic coil 63 and the opposite S-polarity portion 74 of the multi-pole magnet 71 and between the auxiliary magnetic piece 70 magnetized with the N-polarity and the opposite N-polarity portion 72. As a result, the main valve element 3 rotates counter-clockwise in FIGS. 5 and 6 so that it rotates from the first rotary position (FIG. 6 and FIG. 7B) to the second rotary position (FIG. 5 and FIG. 7A).

Thus, the S-polarity portion 74 is adsorbed oppositely to the main magnetic pole piece 66 magnetized with the N-polarity while the N-polarity portion 72 is adsorbed oppositely to the auxiliary magnetic pole piece 70 magnetized with the S-polarity. The main valve element 3 is held at the first rotary position and hence the heat pump cycle is exchanged from the heating mode into the cooling mode.

Thereafter, when energization of the electromagnetic coil 63 is stopped, because of small residual magnetic force of the pair of magnetic pole pieces 66, their N-polarity cannot adsorb the opposite N-polarity portion 74. The S-polarity portion 74 adjacent to the N-polarity portion 72, which has been opposite to the main magnetic pole piece 66 when the main magnetic polarity piece 66 has been located at the second rotary position before energization of the electromagnetic coil 63, is apt to be adsorbed on the main magnetic polarity piece 66 which has lost the magnetic polarity and is only a metal. As a result, force for urging the main valve element 3 to return from the first rotary position to the second rotary position is generated.

However, at the first rotary position of the main valve element 3, owing to the force generated when the N-polarity portion 72 opposite to the auxiliary magnetic pole piece 70 is apt to be adsorbed on the auxiliary magnetic pole piece 70 which has lost the magnetic polarity and is only a metal, the rotating force of the main valve element 3 in a direction of returning from the second rotary position to the first rotary position is suppressed.

When energization of the electromagnetic coil 63 is stopped, the pilot valve 9 descends by the spring force of the spring 61 to close so that communication between the pressure chamber 41 and low pressure side communicating groove 35 is interrupted. Thus, the pressure at the high pressure side communicating groove 37 and high pressure side port 19 is introduced into the pressure chamber 41 through the bypassing gap 43 and the communicating gap of the piston ring 47. Accordingly, since the pressure chamber 41 gives pressure equal to that at the lower portion of the main valve element 3, the main valve element 3 returns to the original descended position owing to the spring force of the spring 61 and its own weight. The main valve element 3 is brought into intimate contact with the valve seat plate 5 so that it is stably held at the first rotary position (flow path exchange completion position). This enhances reliability of the operation.

In the operation described above, the engagement between the guide portion 4 and guiding cylinder 6 suppresses the main valve element 3 from being slanted due to the pressure flowing from the high pressure side into the high pressure side communicating groove 37 at the position displaced in a radial direction from the center of the main valve element 3. For this reason, the valve holding hole 51 of the main valve element 3 does not rub against the pilot valve 9, and the guiding cylinder 39 does not rub against the pilot valve 9.

Accordingly, the ascent/descent operation of the pilot valve 9 and the open/close operation of the pilot valve 9 does not become unstable so that these operations can be surely carried out. No abnormal aberration occurs on the periphery of the main valve element 3 and pilot valve 9, thus improving the endurance thereof.

The valve housing 1 is stamped by deep drawing in such a manner that the large diameter cylinder 2 to receive the main valve element 3, guiding cylinder 6 and guiding cylinder 39 are concentric with one another. Therefore, the number of components can be reduced, and accuracy in size of each component can be improved so that stability and reliability of the valve operation can be improved.

As described above, the multi-pole magnet 71 is made of plastic magnet, and the main valve element 3 and multi-pole magnet 71 are integrally formed by multiple molding. Therefore, the multi-pole magnet 71 and main valve element 3 can be made of different materials. The choices of material of the main valve element 3 can be increased so that resin material with excellent moldability, slidability and fluidity resistance can be used, thereby setting high planarity of a sealing plane where the main valve element 3 is in slidable contact with the valve seat plate 5.

The multi-pole magnet 71, which is made of the plastic magnet, is difficult to generate loss and is also right as compared with that made of sintered metal thus providing sufficient strength. This improves the performance due to unnecessity of a metallic yoke, light-weighting of the rotary flow-path exchange valve and the rotation efficiency of the main valve element 3.

Further, the multi-pole magnet 71, which has a hollow 72, can reduce the material and its own weight.

Although the embodiment has been described with reference to the four-way valve, it is needless to say that the present invention can be similarly applied to a three-way valve.

The three following techniques explained in connection with the embodiment of the present invention can be applied to only a rotary-type flow passage exchange valve equipped with a pilot valve in which the main valve element 3 is placed in a state apart from the valve seat plate 5 during rotation.

(1) The engagement between the guide portion 4 and guiding cylinder 6 suppresses the main valve element 3 from being slanted due to the pressure flowing from the high pressure side into the high pressure side communicating groove 37 at the position displaced in a radial direction from the center of the main valve element 3.

(2) In the valve housing 1, the large diameter cylinder 2 to receive the main valve element 3, guiding cylinder 6 and guiding cylinder 39 are integrally stamped by deep drawing so that they are concentric with one another. The accuracy in size such as concentricity between the main valve element 3 to be received in the large diameter cylinder 2 and the pilot valve 9 to be received in the guiding cylinder 39 for the pilot valve can be improved.

(3) The outer periphery of the tip of the guide portion is provided with a taper 4a so that it is not brought into contact with the inner wall, particularly R-portion 6a, of the guiding cylinder 6.

However, except these three points, the configuration of each component explained in connection with this embodiment (with the multi-pole magnet 71 of the main valve element 3, formed of the plastic magnet of a plastic mixed with magnetic powder, the main valve element 3 and multi-pole magnet 71 are integrally formed by multiple molding, the hollow 72 is formed in the multi-pole magnet 71, and the auxiliary magnetic pole member 69, in addition to the main magnetic pole member 65, is secured to the electromagnetic solenoid 11) can be applied to a general rotary flow path exchanging valve in which the valve element in contact with the valve seat plate rotates.

What is claimed is:

1. A rotary flow-path exchanging valve comprising:

a cylindrical valve housing;

a valve seat plate having a low pressure side port secured to said valve housing and connected to a low pressure side conduit, a high pressure side port connected to a high pressure side conduit and an exchanging port;

a valve element rotatably provided within said cylindrical valve housing and brought into contact with said valve seat plate in its one end surface so that said exchanging port is selectively communicated with either one of said low pressure side port and said high pressure side port by rotation; and an actuator including a multi-pole magnet attached to said valve element, an electromagnetic solenoid, a pair of main magnetic pole pieces, and a pair of auxiliary magnetic pole pieces, wherein said multi-pole magnet includes an S-polarity and N-polarity alternately arranged in a rotary direction attached to said valve element, said pair of main magnetic pole pieces are magnetically coupled with one of said N-polarity and said S-polarity generated when said electromagnetic solenoid is energized and magnetized with the one polarity, and is opposed to the one polarity of said N-polarity and S-polarity at rotary positions out of phase by 180° from each other;

said pair of auxiliary magnetic pole pieces are magnetically coupled with the other polarity of said N-polarity and said S-polarity generated when said electromagnetic solenoid is energized and magnetized with the other polarity, and is opposed to the other polarity of said N-polarity and S-polarity at rotary positions out of phase by 180° from each other; and said main magnetic pole pieces each has a larger sectional area and is magnetized with stronger magnetic force than said auxiliary magnetic pieces.

2. A rotary flow-path exchanging valve according to claim 1, wherein said valve element is provided movably in a rotary axial direction thereof within said valve housing so that pressure at said high pressure side is introduced in a pressure chamber defined on the side of the other end surface opposite to said one end surface through a bypassing gap between an outer periphery of said valve element and an inner periphery of said valve housing, and said valve element is provided with a pilot valve for selectively communicating said pressure chamber with said low pressure side port so that when said pilot valve in a closed state by energization of said electromagnetic solenoid, said valve element is moved by a pressure difference generated between said pressure chamber and said high pressure side port whereby said valve element is rotated by said electromagnetic actuator in a state where said one end surface of said valve element is separated from said valve seat in the rotary axial direction.

3. A rotary flow-path exchanging valve according to claim 1, wherein said main magnetic pole pieces constitute legs of a main magnetic pole member connected so as to form a gate shape, while said auxiliary magnetic pole pieces constitute legs of an auxiliary magnetic pole member connected so as to form a gate shape, and said main pole member is secured to said electromagnetic coil while said auxiliary magnetic pole member is spot-coupled with and positioned for said main pole member by means of bridging pieces for connection.

4. A rotary flow-path exchanging valve according to claim 1, wherein said main magnetic pole pieces each has a larger size than said auxiliary magnetic pole pieces in their peripheral directions.

* * * * *